United States Patent [19]

Yaeger

[11] Patent Number: 4,895,253

[45] Date of Patent: Jan. 23, 1990

[54] LOCKING DEVICE FOR RESTRICTING THE VIEWING OF VIDEO CASSETTES

[76] Inventor: Ivan Yaeger, 1277 NW. 88th St., Miami, Fla. 33147

[21] Appl. No.: 350,092

[22] Filed: May 10, 1989

[51] Int. Cl.⁴ .............................................. B65D 85/672
[52] U.S. Cl. ...................................... 206/387; 206/1.5; 206/807
[58] Field of Search .......................... 206/1.5, 387, 807

[56] References Cited

U.S. PATENT DOCUMENTS

| | | | |
|---|---|---|---|
| 3,514,170 | 5/1970 | Shewchuk | 312/107 |
| 4,084,865 | 4/1978 | Joyce | 206/387 |
| 4,153,178 | 5/1979 | Weavers | 220/306 |
| 4,177,898 | 12/1979 | Weavers et al. | 206/387 |
| 4,211,337 | 7/1980 | Weavers et al. | 220/341 |
| 4,243,142 | 1/1981 | Foreman | 206/387 |
| 4,381,836 | 5/1983 | Rivkin et al. | 206/807 |
| 4,432,453 | 2/1984 | Berkman | 206/387 |
| 4,518,084 | 5/1985 | Berkman | 206/387 |
| 4,558,782 | 12/1985 | Iverson | 206/387 |
| 4,634,004 | 1/1987 | Mortensen | 206/807 |
| 4,658,955 | 4/1987 | Eichner | 206/807 |
| 4,771,888 | 9/1988 | Lundeen | 206/387 |

Primary Examiner—Jimmy G. Foster

[57] ABSTRACT

A device that can be easily and temporarily locked onto a video cassette to prevent insertion of said video cassette into video equipment. Said device consists of a stiff but flexible locking band 2 shaped to fit widthwise around a video cassette, provisions for securing said locking band 2 onto said video cassette 12, and a retainer cylinder 8 that fits into on cassette reel socket 18 of said video cassette. Holes 6 in front tabs 4 of locking band 2 allow a padlock or other locking device to secure said tabs 4 together, which prevents unauthorized removal of the device. Locking band 2 and retainer cylinder mounting pin 10 will not allow the video cassette to fit into video equipment, which prevents use of said video cassette until the device is removed.

1 Claim, 2 Drawing Sheets

LOCKING DEVICE FOR RESTRICTING THE VIEWING OF VIDEO CASSETTES

BACKGROUND—FIELD OF INVENTION

This invention relates to video cassettes and video cassette storage systems.

BACKGROUND—DESCRIPTION OF PRIOR ART

Curtailing the unauthorized viewing of video-taped material featuring restricted or adult ratings has become a concern of adult consumers who have children in the household. Currently, there are no devices available to these individuals that prevents a video cassette from being viewed, tampered with, or inserted into video equipment.

OBJECTS AND ADVANTAGES

Accordingly, I claim the following objects and advantages of my invention: to provide a device that can be attached onto any video cassette to prevent the viewing of recorded material, to provide such a device that once installed will prevent said video cassette from being inserted into video equipment, to provide such a device that once installed can be used in conjunction with many currently-available video cassette storage systems, and to provide such a device that can be easily installed or removed at will by the user without causing damage to said video cassette.

DRAWING FIGURES FIG. 1 shows a side view of the uninstalled invention.

Figure 1:
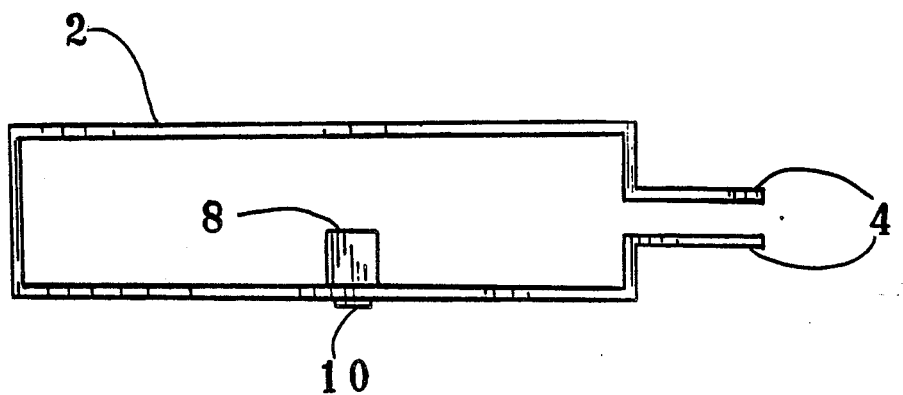

DRAWING REFERENCE NUMERALS 2 locking band
4 front tabs of 2
6 holes in 4
8 retainer cylinder
10 retainer cylinder mounting pin
12 video cassette
14 magnetic tape
16 cassette reel
18 cassette reel socket
20 video cassette outer casing These Drawing Figures do not feature the aforementioned locking device because said device can assume a variety of embodiments.

DESCRIPTION

FIG. 1 shows the device according to the preferred embodiment of the invention. The device comprises a locking band 2, which is preferably made of flexible metal or plastic, that is molded to conform widthwise around the casing of a video cassette. Retainer cylinder 8 is rigidly attached to the inside surface of the lower strip of locking bend 2; retainer cylinder 8 is positioned so that it fits into the tape reel socket of a video cassette. Locking band front tabs 4 feature holes 6 or other provisions that allow a locking device (such as a padlock) to hold said tabs together firmly.

OPERATION

Figure 2:
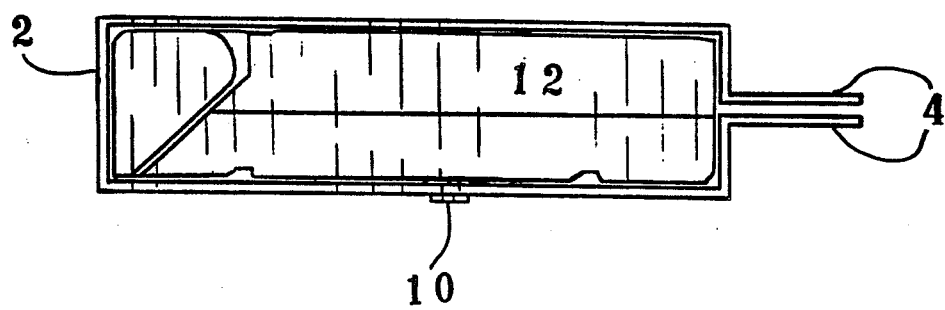
FIG. 2 shows a side view of the invention attached onto a video cassette.
Figure 3:
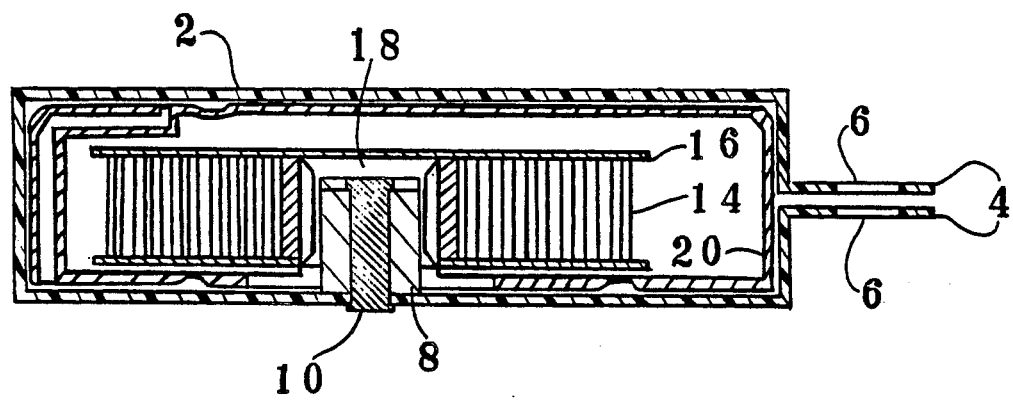
FIG. 3 shows a cross-section side view of the invention that has been attached onto a video cassette.
Figure 4:
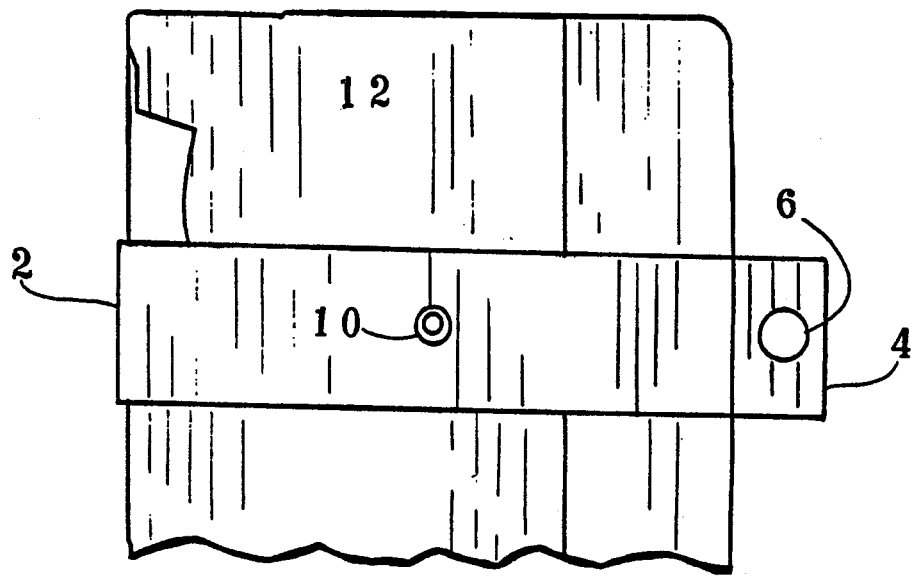
FIG. 4 shows a bottom view of the invention that has been attached onto a video cassette.

This device shown in FIG. 1 consists of locking band 2 that is placed widthwise around the casing of a video cassette, and a retainer cylinder 8 that fits inside of one of the cassette's tape reel sockets 18. Placement of retainer cylinder 8 into said tape reel socket 18, as shown in FIGS. 2,3 and 4, holds locking band 2 in position and prevents the cassette reel 16 from being rotated. Locking band 2 has front tabs 4 with holes 6, best seen in FIGS. 3 and 4, or similar provisions to incorporate a lockable securing mechanism (such as a key or combination-operated padlock). Therefore, when the device is installed, as shown in FIGS. 2,3 and 4, front tabs 4 can be secured against each other with said lockable securing mechanism to prevent removal of said device. Therefore, the installation of this device prevents the video cassette from being inserted into video equipment, disassembled or tampered with in any similar fashion.

While the previous descriptions may present several specificities, these should not be construed by the reader as limitations of the invention's scope but as illustrations of the preferred embodiment thereof. Those skilled in the art may envision several other variations within this scope.

I claim:

1. A device that restricts the viewing of a video cassette by preventing the insertion of said video cassette into video equipment, consisting of:
   (a) a band composed of a strip of stiff, cut-resistant material, bent into a U-shape so as to conform widthwise around the outside of a video cassette, and featuring straight upper and lower segments that are slightly longer than the overall width of said video cassette,
   (b) two front tabs, formed by the extension of the upper and lower segments of said band, that meet together a parallel fashion and feature a plurality of holes or projections to accommodate a locking device, and
   (c) a cylinderical post which is securely mounted onto the inner side of the aforementioned straight lower segment of the aforementioned band and positioned to coincide with the tape-reel socket of a video cassette.

* * * * *